Jan. 1, 1929.
E. D. TILLYER
1,697,030
OPHTHALMIC LENS
Filed March 9, 1927
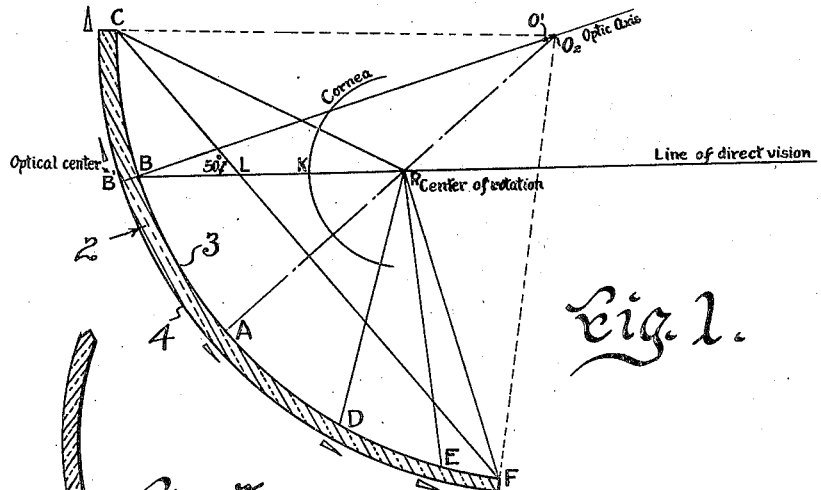
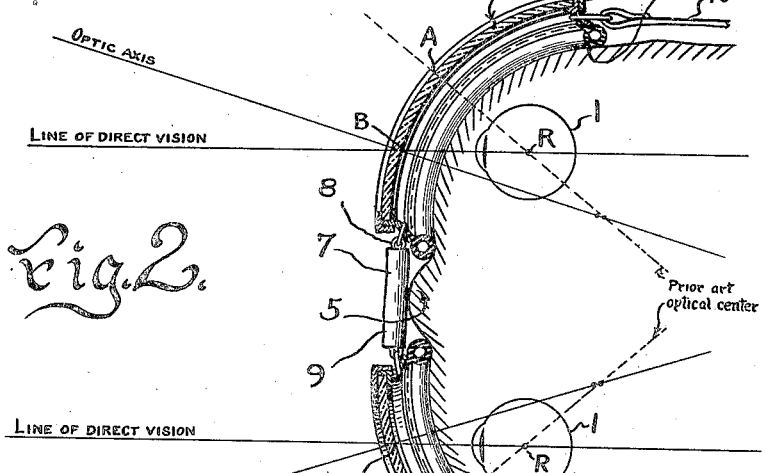
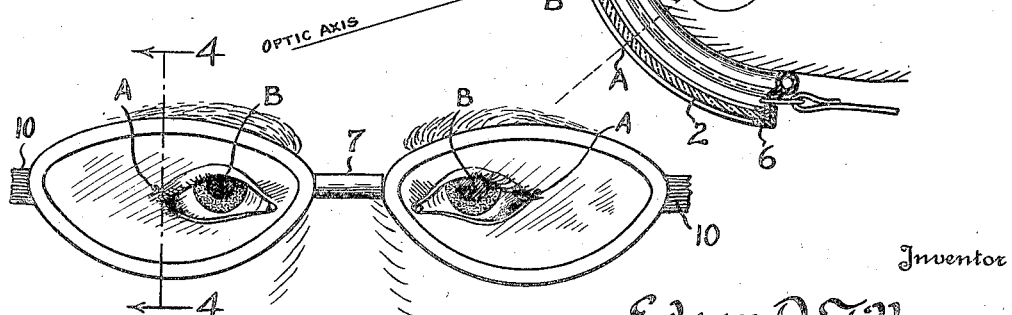
Inventor
Edgar D. Tillyer
By Harry H. Styll
Attorney Patented Jan. 1, 1929.

1,697,030

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC LENS.

Application filed March 9, 1927. Serial No. 173,879. REISSUED

This invention relates to improvements in ophthalmic lenses and mountings for the same and has particular reference to an improved ophthalmic lens and mounting for the same to be used in goggles for aviators, autoists and the like.

The principal object of the invention is to reduce the oblique astigmatism and prismatic deviation usual in devices of this character.

Another object of the invention is to provide a lens for a device of this character which is designed from the center of rotation of the eye to give the best vision throughout the useful range of vision of the eye.

Another object of the invention is to provide a lens for a device of this character that will give the best average vision throughout the range of vision of the lens.

Another object of the invention is to provide a lens for a device of this character that will have sensibly no power at a position straight in front of the eye.

Another object of the invention is to provide a device of this character that will provide binocular vision without eye strain resulting from extraneous prismatic action present in the prior art devices.

Another object of the invention is to provide in a device of this kind an optically designed lens in contra-distinction to non-optical lenses hitherto used for analogous purpose.

Other objects and advantages of the invention will be apparent from the following description taken in connection with the accompanying drawings and it is apparent that many changes may be made in the details of construction and arrangements of parts without departing from the spirit of the invention as set forth in the accompanying claims. I, therefore, do not wish to be limited to the exact details of construction and arrangements shown, the preferred forms only having been shown by way of illustration.

Referring to the drawings:

Fig. 1 is a diagrammatic cross sectional view of the lens of the invention showing the optical determination of same;

Fig. 2 is a cross section through the lenses and lens mountings of a goggle in position on the face showing the location of the eyes, the head and the nose;

Fig. 3 is a front view of a goggle embodying the device in place on the face.

Fig. 4 is a cross section of the lens on line 4—4 of Fig. 3 and;

Fig. 5 is a similar view to Fig. 4 showing a cross section thru a lens having curvature in its vertical meridian.

It is well known to those skilled in the art that a curved lens having concentric faces about the same center will produce a lens concave in power, that the lens instead of having no power will have a minus power and also that a lens wherein the two faces have the same radius of curvature will have a positive power. It is also well known that somewhere in between these two forms there exists a lens having neither positive nor negative power along the axis of this lens, i. e., the line connecting the two centers of curvature. This axis in the prior art lenses has been placed near the geometrical center of the lens that is at a point "A" of the drawings. In wearing this goggle as in Fig. 2 it is apparent that this optical axis is not used for binocular vision in its usual fields but the part of the lens nearer the nose is the part that is usually used for this purpose. In the prior art lenses the optical abberations as the lenses are worn are very large in this customary binocular field of useful vision.

In the lens of the invention the radii of the surfaces are computed to give a zero optical power and the optical center in front of the eye or at B, Fig. 1 and with a definite thickness there. It will be apparent from Fig. 2 wherein the eyeballs are indicated at 1 that after a certain angle is reached for side vision binocular vision can no longer be obtained but only monocular vision on one side or other of the nose, and that, therefore, while the errors of vision where there is binocular vision will be double, that is, those of one side plus those of the other and where there is only monocular vision each lens has the single vision of that particular type; in other words, the errors for binocular vision are doubled and those for monocular vision are not.

The prior art errors of a lens centered at "A" are of two types, one, oblique astigmatism due to the angle of line of sight away from the optical axis and the other, a strong prismatic action which is equivalent to a prism at "B" of more than one prism dioptre, base out. This prism is in front of both eyes so that the binocular imbalance is double this one dioptre or two prism dioptres which produces serious eye strain. The actual astigmatic abberation in cases of this kind is approximately one eighth of a dioptre. In the goggle of the invention these errors have been reduced to less than one half of these values. At outer portions where monocular vision only can exist because of the nose, etc., the prismatic error is of no importance as it cannot produce muscular imbalance. There is no strain between the two eyes, and consequently this error can be much larger without any eye strain.

Referring to Fig. 1, R represents the center of rotation of the eye and the line R—B represents the line of direct vision ahead. The point B is to be made the optical center of the lens. The center of curvature $O_2$ of the inner surface 3 of the lens 2 lies on the line $BO_2$ which is normal to the surface 3 at B. The center of curvature $O_1$ of the outer face 4 of the lens 2 lies on a line through the point B and the point $O_2$ and this determines the optical axis of the lens.

In the lens indicated in Fig. 1 which is a cylindrical lens but just as well might be a spherical lens, the radius $BO_1$ equals plus 58.89 millimeters and the radius $AO_2$ equals minus 58.08 millimeters; the center thickness at the point BB' equals 2.43 millimeters. The chord CF equals 77 millimeters and the chord CB equals 19.1 millimeters. The angle BLC equals 50 degrees and the distance BK equals 22.2 millimeters. This angle and distance being an average position of the lens as worn by various people and will be varied with the major dimensions of the lens and the position of the optical axis to correspond. The circle of radius RK is the distance from the center of rotation of the eye to the cornea. D and E are additional points of the lens defined by the chord BD equal 41.16 millimeters and chord BE equals 55.39 millimeters.

Calculation of the lens constructed as shown in Fig. 1 gives the following figures:

| Line of vision | Astigmatism | Deviation | Prism displacement |
| --- | --- | --- | --- |
| RC | 0.19 diopters | −0.64 degrees | −1.1 prism dioptres. |
| RB | 0.04 diopters | −0.25 degrees | −0.4 prism dioptres. |
| RA | 0.00 diopters | +0.33 degrees | +0.6 prism dioptres. |
| RD | 0.13 diopters | +0.73 degrees | +1.3 prism dioptres. |
| RE | 0.30 diopters | +1.00 degrees | +1.7 prism dioptres. |
| RF | 0.38 diopters | +1.09 degrees | +1.9 prism dioptres. |

It will be understood that the optical center does not have to be right at "B". It might well be nearer "C". Then the values of astigmatism and prism displacement at B would be reduced but then that at "A" would be increased, so it is well to obtain a good balance. The exact point where this balance is to be made is to be determined for the specific use of the device. From the foregoing data and tables it will be seen that this lens has sensibly plano power throughout and actual plano power at some predetermined point and yet has an optical axis (which connects the two centers of curvature) and consequently has an optical center where this optical axis pierces the lens. Also it is clear that if these two curves are concentric, there is no optical center, yet the lens has power.

At the point C the prism has its base towards A. At the point between A and B the base of the prism is reversed. The relative prism between the two eyes is twice as great as for one eye. There is more prism at the extreme angle F but only monocular vision is obtained there as the nose is in the way; hence there is no eye strain, while on vision straight ahead on the line R—B there is only 0.4 prism dioptres. The calculations for obtaining astigmatism, deviation and prism displacement are well known to those skilled in the design of ophthalmic lenses.

Referring to the table, it will be seen that vision along the line R—B is very good, the astigmatism being only 0.04 dioptres the deviation 0.25 degrees and the prism displacement 0.4 prism dioptres. The vision along the line R—A is also very good, all of which is in line of binocular vision.

In Fig. 2 the eyeball is designated by 1, the center of rotation of the eye at R, and the nose by 5. The lens 2 is held in the lens frames 6 which are secured together by means of the bridge 7 which in the present instance is a chain 8 covered by a piece of rubber tubing 9. The lenses are held in place on the nose by means of the head band 10 and a soft flexible face engaging portion 11 is also secured to the frame 6 to make the fit of the frame snug against the face to keep out air, dust, etc., and also to give a comfortable support to the frame.

It will be noted that the depth of the frame, that is, the distance from the face contact to the outer surface of the lens, is very small. The shorter this distance the wider range of vision one has.

Referring to Fig. 3, it will be noticed that the mechanical center A of the lens is some distance from the optical center B, the optical center B being located approximately at the center of the eye when the eye is looking straight forward.

The lenses 2 are ground to optical requirements described above, as shown in Fig. 1. They are then edged to shape, shown in Fig. 3, and secured in the frames 6, care being taken that in locating the lenses in the frames the optical center of the lens B falls approximately at the center of the eye, as shown in Fig. 3.

In manufacturing the frame great care is taken to design the frame to fit the facial characteristics snugly so that when the goggle is in place on the face the lenses take the positions shown in Fig. 3 as near as may be.

From the foregoing description it will be seen that there has been devised an optical lens having an optical center at B in which astigmatism, deviation and prism displacement have been considered and calculated so as to give the least possible oblique astigmatism and other optical errors and to produce a wide field of vision, particularly binocular vision without strain so that the eye in its movement may have the clearest possible vision which may be quickly obtained and without fatigue. It will also be clear that a lens of this kind is an optically designed lens designed and manufactured to obtain certain optical advantages which are not present and which cannot be obtained with the plain glass lenses hitherto in use. It will also be seen that the invention is one particularly adapted for uses wherein accurate and quick vision must be obtained, such as for aviators where defective vision may readily have disastrous results. This is of particular importance to aviators at the present time where long sustained flights are being made and the eye fatigue from an imperfect goggle becomes of first importance.

Having described my invention, what I claim is:

1. An ophthalmic lens having surfaces and optical properties computed for a definite relationship to the eye when in use and having substantially zero power along its optical axis with surfaces approximating the curve of the forehead, the chord connecting the nasal and temporal edges making an angle of less than seventy degrees with the line of straight ahead vision, the optical center lying substantially at a point directly in front of the pupil of the eye for straight ahead vision and the distance from the geometrical center to the temporal edge being more than one and a half times the distance from the point of straight ahead vision to the nasal edge, the temporal edge being extended beyond and rearwardly of the external canthus of the eye.

2. An ophthalmic lens having surfaces and optical properties computed for a definite relationship with the eye when in use and having curved surfaces the chord of which connecting the nasal and temporal edges forms an acute angle with the line of straight ahead vision and whose optical center lies substantially at a point directly in front of the eye for straight ahead vision and the temporal portion of which is extended to extend beyond and rearwardly of the external canthus of the eye.

3. An ophthalmic lens having surfaces and optical properties computed for a definite relationship with the eye when in use whose horizontal cross section is the same for all horizontal planes passing therethrough being bounded by divergent curved lens surfaces and whose vertical cross sections on any vertical plane passing therethrough has parallel bounding face surfaces, the chord of the surfaces connecting the nasal and temporal edges forming an acute angle with the line of straight ahead vision, the power being substantially zero along the optical axis, the optical center being located substantially at a point directly in front of the eye for straight ahead vision, the temporal side of the lens being extended beyond and rearwardly of the external canthus.

4. An ophthalmic lens having surfaces and optical properties computed for a definite relationship with the eye when in use and having different radii for its front and back surfaces, the centers of curvature of which are separated one from the other, its optical center being located at a point substantially directly in front of the eye for straight ahead vision and having its temporal side extended beyond and rearwardly of the external canthus and whose chord connecting the nasal and temporal edges makes an acute angle with the line of straight ahead vision.

5. An ophthalmic lens having surfaces and optical properties computed for a definite relationship with the eye when in use and having its optical center lying between fifteen and thirty millimeters from the nasal edge and having a deviation in power along the optical axis of less than one-tenth diopter from zero power and having its temporal side extended beyond and rearwardly of the external canthus of the eye and whose chord connecting the nasal and temporal edges makes an acute angle with the line of straight ahead vision.

6. An ophthalmic lens having surfaces and optical properties computed for a definite relationship with the eye when in use having curved surfaces and having its optical center approximately twenty millimeters from the nasal edge, a total horizontal length of approximately eighty-five millimeters and whose chord connecting the temporal and nasal edges makes an acute angle with the line of straight ahead vision and which has substantially zero power along the optical axis and which has a thickness along the optical axis of over one and a quarter millimeters.

7. An ophthalmic lens having surfaces and optical properties computed for a definite relationship with the eye when in use, having curved surfaces and having its optical center substantially midway between its geometrical center and the nasal edge, and whose distance from the geometrical center to the temporal edge is greater than one and a half times the distance from the point of straight ahead vision to the nasal edge and whose chord connecting the nasal and temporal edges makes an acute angle with the line of straight ahead vision and which has substantially zero power along the optical axis and a thickness of over one and a quarter millimeters along the same axis.

8. An ophthalmic lens having surfaces and optical properties computed for a definite relationship with the eye when in use and having curved surfaces, the chord of which connecting the temporal and nasal edges forms an acute angle with the line of straight ahead vision and whose optical center lies substantially at a point directly in front of the eye for straight ahead vision and the distance from the geometrical center to the temporal edge is greater than one and a half times the distance from the point of straight ahead vision to the nasal edge.

9. An ophthalmic lens having surfaces and optical properties computed for a definite relationship with the eye when in use whose horizontal cross section is the same for all horizontal planes passing therethrough, being bounded by divergent curved surfaces and whose vertical cross section on any vertical plane passing therethrough has parallel bounding face surfaces, the chord of the surfaces connecting the nasal and temporal edges forming an acute angle with the line of straight ahead vision, the power being substantially zero along the optical axis, the optical center being located substantially at a point directly in front of the eye for straight ahead vision and the distance from the geometrical center to the temporal edge being greater than one and a half times the distance from the point of straight ahead vision to the nasal edge.

10. An ophthalmic lens having surfaces and optical properties computed for a definite relationship with the eye when in use and having different radii for its front and back surfaces, the centers of curvature of which are separated one from the other, its optical center being located at a point substantially directly in front of the eye for straight ahead vision and the distance from the geometrical center to the temporal edge being greater than one and a half times the distance from the point of straight ahead vision to the nasal edge.

11. An ophthalmic lens having surfaces and optical properties computed for a definite relationship with the eye when in use, having curved surfaces and having its optical center approximately twenty millimeters from the nasal edge and whose chord connecting the temporal and nasal edges makes an acute angle with the line of straight ahead vision and which has substantially zero power along the optical axis and which has a thickness along said axis of over one and a quarter millimeters and the distance from the geometrical center to the temporal edge being greater than one and a half times the distance from the point of straight ahead vision to the nasal edge.

12. An ophthalmic lens having surfaces and optical properties computed for a definite relationship with the eye when in use, having curved divergent surfaces, the chord of which connecting the temporal and nasal edges makes an acute angle with the line of straight ahead vision, the length of the lens being substantially twice as long as the height, the optical center being located approximately midway between the geometrical center and the nasal edge, the power being substantially zero along the optical axis and the thickness more than one and a quarter millimeters along said axis and the distance from the geometrical center to the temporal edge being greater than one and a half times the distance from the point of straight ahead vision to the nasal edge.

13. An ophthalmic lens having surfaces and optical properties computed for a definite relationship with the eye when in use having curved divergent surfaces the chord of which connecting the nasal and temporal edges makes an acute angle with the line of straight ahead vision, the height of which is approximately that of the ordinary prescription lens and the length approximately twice that of the ordinary prescription lens, the optical center lying approximately midway between the geometrical center and the nasal edge, the power along the axis being substantially zero and the thickness on said axis being more than one and a quarter millimeters.

14. An ophthalmic lens having surfaces and optical properties computed for a definite relationship with the eye when in use and having curved divergent surfaces, the height being approximately forty-two millimeters, the length approximately eighty-five millimeters, the optical center approximately twenty millimeters from the nasal edge, the power along the optical axis substantially zero and the thickness along said axis more than one and a quarter millimeters.

EDGAR D. TILLYER.